United States Patent [19]
Guillemain

[11] 3,821,618
[45] June 28, 1974

[54] ANTI-ELECTROCUTION SAFETY DEVICE FOR ELECTRICAL CONNECTORS

[76] Inventor: Jean-Claude Guillemain, 5 Rue Henri Rabourdin, 78, 140, Velizy, France

[22] Filed: Mar. 23, 1973

[21] Appl. No.: 344,147

[30] Foreign Application Priority Data
Mar. 27, 1972 France .......................... 72.10593

[52] U.S. Cl. ............................................ 317/262 S
[51] Int. Cl. ............................................ H02h 1/00
[58] Field of Search....... 317/16 R, 14 C, 31, 262 S; 337/255, 256, 266, 268, 269, 273; 338/220, 221; 174/5 R, 5 SB, 5 SG; 231/2 E; 256/10; 272/27 R, 27 N; 328/7; 339/36, 37, 147, 62, 63, 195, 196

[56] References Cited
UNITED STATES PATENTS

| | | |
|---|---|---|
| 1,942,178 | 1/1934 | Machenheimer ................. 337/268 |
| 2,441,812 | 5/1948 | Haffner ............................ 231/2 E |
| 3,064,970 | 11/1962 | Thompson ....................... 272/27 N |
| 3,366,854 | 1/1968 | Robinson .......................... 256/10 |
| 3,436,711 | 4/1969 | Borzoni............................. 337/255 |
| 3,747,897 | 7/1973 | Conley............................. 256/10 |

Primary Examiner—J. D. Miller
Assistant Examiner—Patrick Salce
Attorney, Agent, or Firm—Lane, Aitken, Dunner & Ziems

[57] ABSTRACT

To protect against injury from careless handling of live domestic electrical plugs and sockets, superficial electrodes connected to house current via concealed current limiting devices are attached to the exposed surface of the connector near the dangerous electrical terminals to provide a harmless, unpleasant electrical sensation upon reckless touching of the connector.

20 Claims, 24 Drawing Figures

PATENTED JUN 28 1974 3,821,618

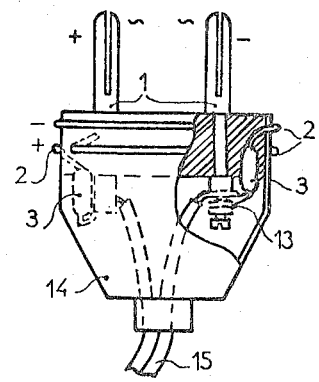
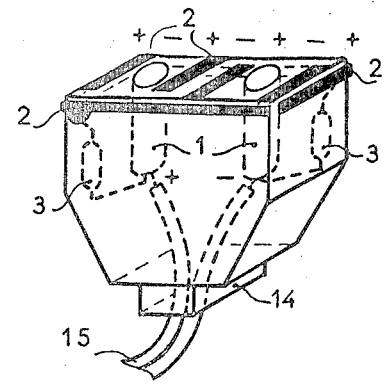
FIG 9  FIG 10
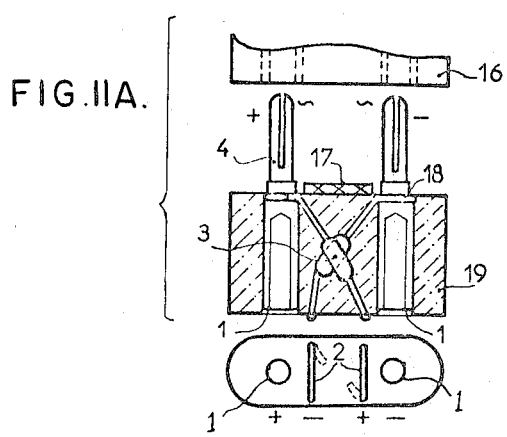
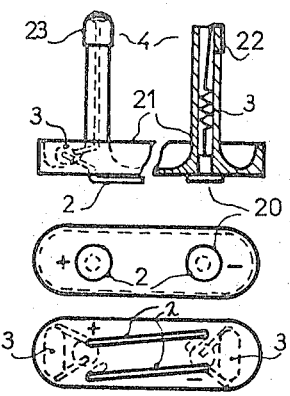
FIG 11A  FIG 12A
FIG 11B  FIG 12B
         FIG 12C
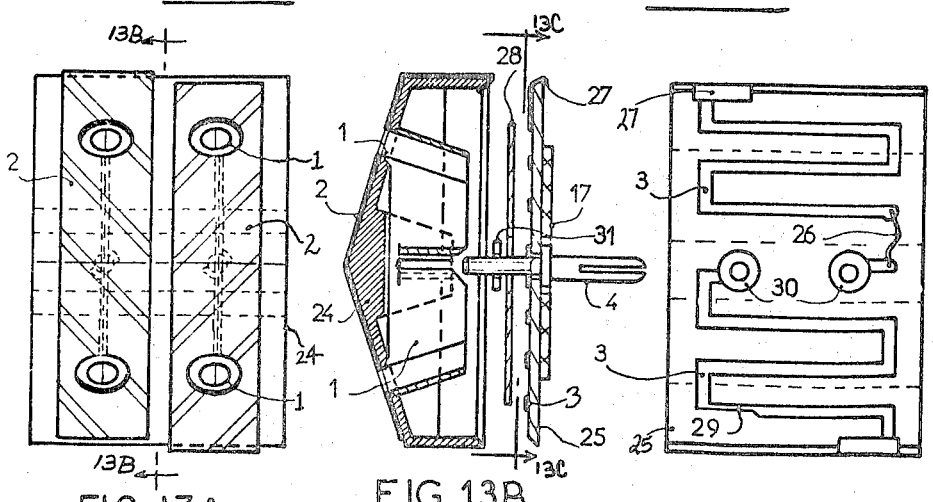
FIG 13A  FIG 13B  FIG 13C

ANTI-ELECTROCUTION SAFETY DEVICE FOR ELECTRICAL CONNECTORS

BACKGROUND OF THE INVENTION

This invention relates to an active, anti-electrocution socket protection device for electrical connectors, intended to prevent serious injury from accidental electrocution or electrocoagulation by reckless touching of conventional domestic electrical connectors.

The most frequently used passive devices consist of forms of connectors making it difficult to gain direct access to dangerous electrodes, as well as providing an insulating covering for these electrodes on their unused protruding portions. Likewise, insulating stoppers or socket caps which are inexpensive but often very hard to use, make it possible temporarily to insulate female domestic wall receptacles, which so often are the cause of serious accidents among young children. Other more complicated devices involving hinged members that conceal or obstruct the dangerous electrodes are also available although they do not offer any real safety. The imagination of children and their complete ignorance of the risks involved often cause these children to make the bitter discovery of the dangers of electricity.

With such devices, even adults are not safe from fatal accidents since the daily handling of household appliances (between two power discharge points) involves a manner of utilization which usually exhibits little in the way of precautions. The use is often almost subconscious and therefore dangerous, such as in plugging in an appliance "while thinking of something else," doing this sort of thing with wet feet, negligence in grounding household appliances, and so on.

SUMMARY OF THE INVENTION

This invention offers a method and simple apparatus for implementation, easily manufactured at modest cost, making it possible to significantly improve safety for children and adults in the immediate vicinity of electrical connectors, particularly by making persons aware of daily electrical risks while still leaving the connection electrodes, which are usually obstructed by socket caps, fully available.

The basic principle springs from the concern for protection and danger following a disagreeable but harmless electrical shock in contact with one or more slightly electrically conducting electrodes, close to dangerous electrodes and placed in such a manner that an absent-minded utilization of the connector would actually promote this disagreeable electrical shock without, however, producing any reaction other than future distrust.

The present invention involves the utilization of current-limiting electrode assemblies, with various configurations, associated with different types of usual conductors, while the very low energy available for the electrification of the electrodes is provided by the principal electrical network, usually house current.

Other advantages and features of the invention will emerge from the following specifications given here with reference to the attached drawings and, by way of explanation, but without any limitation, offering several versions and applications in accordance with the spirit of the invention.

BRIEF DESCRIPTION OF THE DRAWINGS

FIGS. 9 and 10 are side and perspective views respectively of male and female connectors equipped with a version of the invention.

FIG. 11A is a side view of a male/female connector or adapter with portions in cross-section illustrating another embodiment of the invention, the top portion of the drawing showing a mating female connector.

FIG. 11B is a plan view of the female end of the adapter of FIG. 11A.

FIG. 12A is a side view of a conventional socket cap modified to incorporate an embodiment of the invention.

FIGS. 12B and 12C represent plan views of two different arrangements of superficial conductors on the exposed end of the socket cap of FIG. 12A.

FIG. 13A is an end view of a multi-socket adapter embodying the invention.

FIG. 13B is a cross-sectional view taken along lines 13B—13B of FIG. 13A showing the components of adapter in a slightly axially exploded view.

FIG. 13C is a cross-sectional view taken along lines 13C—13C of FIG. 13B.

DETAILED DESCRIPTION OF THE INVENTION

Figure 1:
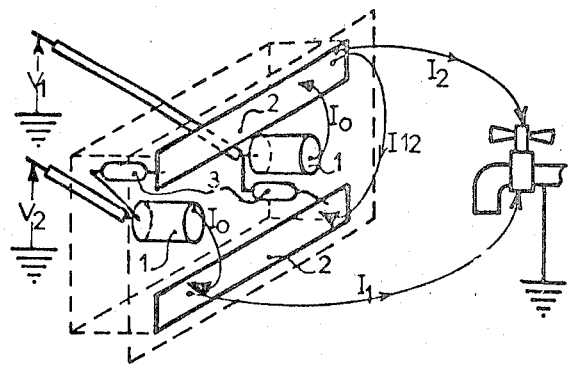
FIG. 1 is a schematic diagram illustrating an embodiment of the invention used in connection with a typical wall socket.

FIG. 1 represents the physical arrangement of the basic device, in the case of a female wall outlet or socket with any shape whatsoever. Network or house voltage $V_1$ and $V_2$ can be used for domestic purposes at terminals 1. The socket is equipped with two flat matallic strips 2, thin enough so as not to interfere with normal use of the socket and electrified by means of safety impedances 3 whose function is to guarantee just sufficient passage of an upleasant, but harmless current when touched on the outside. Each strip 2 is connected to a corresponding terminal 1 via impedance 3.

Numerous forms and arrangements of electrodes 2 may be adapted to aesthetic and technical necessities so as to promote the adhesion of the safety metallic strips in the vicinity of the dangerous terminals 1.

Several types of safety circuit operation can be envisioned: (1) touching, causing the flow of current between ground and one of the electrodes 2 (current $I_1$ or $I_2$); (2) touching between or across the metallic strips (current $I_{12}$); (3) touching between a strip 2 and one of the dangerous live terminals 1 (current $I_0$).

The maximum current available for electrifying the strips 2 may be calculated, so as to guarantee satisfactory safety, by means of Ohm's Law, in the most unfavorable cases, which are those of currents $I_0$, $I_1$, and $I_2$, for which a single impedance element is loaded.

This maximum current value is such that:
$I_1 = V_1/Z_{(3)}$;   $I_0 = (V_1 - V_2)/Z_{(3)}$;
$I_2 = V_2/Z_{(3)}$;   $I_{12} = (V_1 - V_2) / (Z_{(3)} + Z_{(3)})$;
with the currents expressed in milliamperes, the voltages expressed in volts, and the impedance of the limiters $Z_{(3)}$ expressed in kilohms.

It is evident that no direct connection should be established between the electrification network and the safety network and that an effective current limiter device must be connected between them so as to avoid accidents which the apparatus seeks to prevent.

Figure 2:
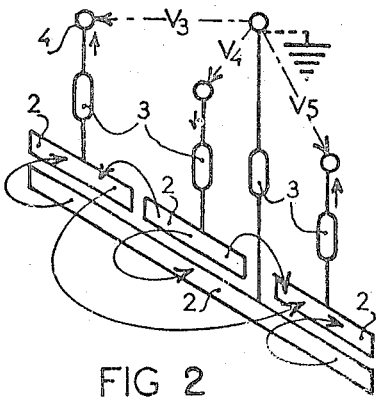
FIG. 2 is a schematic diagram illustrating another embodiment of the invention for use with a multi voltage connector.

FIG. 2 symbolizes the organization of a device similar to the previous one in the case of a multivoltage or multiphase connector $V_3$, $V_4$, $V_5$ . . . , where the utilization sockets are merged with those for the voltage inputs.

A current limiter or impedance element 3, as in the earlier case, is indispensable between each metallic strip 2 and the high-power dangerous terminals 4.

Nevertheless, by means of certain precautions, one might possibly make an exception for the ground strip (and it alone) in the case where a ground — with a great potential difference with respect to the other electrodes — is available.

The protection of a single-voltage or multivoltage connector could also be accomplished by a single pair of strips 2, supplied by one or several available voltages, or by a single metallic strip electrified in a manner defined with respect to ground, the latter configuration nevertheless diminishing the worthwhile aspect of the system in locations not permitting good ground connection (fabric wallpaper, parquet floors, etc.), which, however, might possibly be used in very humid environments. A grounded metallic strip, of course, is optional.

Figure 3A:
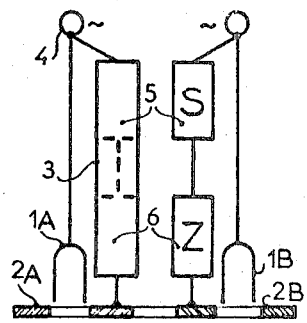
FIG. 3A is a schematic diagram illustrating another form of the invention with both current limiting and optional safety elements.

FIG. 3A schematically represents various preferred components that can be used to make up the safety current limiter or impedance element 3. Element 3, which ensures the electrification of electrodes 2 from power terminals principal 4 or 1, can be divided into two parts:
a. A current limiter element or impedance Z: (6), and
b. An optional safety element S: (5). These two components are separately symbolized in FIG. 3B.

The impedance Z may consist of the following:
A capacitive impedance: $Z = K/(2 \pi fc)$, (see FIG. 3(c));
A resistive impedance: $Z = KR$, (see FIG. 3(d));
With Z and R expressed in Ohms, C, the capacitance, expressed in Farads, $f$, the frequency, expressed in hertz ($\pi = 3.14...$), and K, the multiplier coefficient (a constant or a function of a variable, for example, the temperature for a resistance with a positive temperature coefficient), or a combination of these two components, arranged in series, parallel, or hybrid, according to the safety requirements adopted.

This impedance 6 must be capable of supporting, without damage, the continuous passage of a maximum current in the cases for $I_0$, $I_1$, and $I_2$ defined earlier or an even more unfavorable foreseeable case. In the case of a capacitive impedance, the heat dissipation need not be feared and the safety criterion will bear on the reliability of the breakdown voltage of the condenser and its resistance to leakage. In the case of a resistive impedance, the heat dissipation, under certain conditions, becomes the main concern as well as the reliability of the component used in terms of the breakdown voltage.

The component will thus have to be capable of continuously dissipating power P such as: $P = R(I_n)^2$ where P is the power dissipated in watts, R is the resistance of the impedance in Ohms, and $I_n$ is the average current in amperes, that is, a hypothetical, continuous average current due to improper utilization of the device.

Figure 3B:
FIGS. 3B–3F are schematic diagrams showing several implementations of the system of FIG. 3A with different components.
Figure 3C:
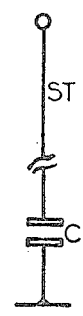
Figure 3D:
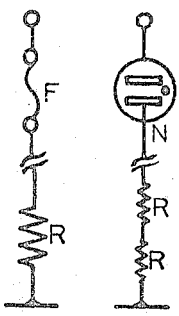
Figure 3E:
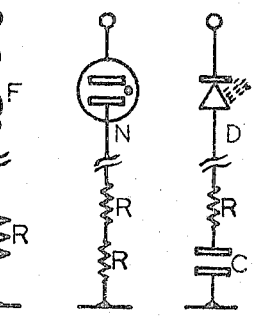
Figure 3F:
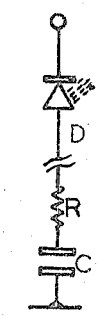

In the case of a complex or reactive impedance (e.g., a capacitive and resistive combination as shown in FIG. 3F), the reliability criteria to be selected will involve a compromise or sum of the earlier precautions, in proportion to the respective influence of the components used. Likewise, the use of several components of an identical nature and possibly featuring different technologies is envisioned in order to remove the risk of defectiveness almost completely.

Safety element S in FIG. 3B may be any of the following:

A direct connection "ST" as shown in FIG. 3C, in cases where the intrinsic reliability of the impedance component Z is sufficient;

A fuse F as shown in FIG. 3D, of very low current capacity (several milliamperes), intended to be associated with an impedance whose reliability has been judged to be insufficient, whose normal operation in the most unfavorable cases facilitates the passage of current insufficient to blow the fuse. The fuse could be blown by failure of the resistor or when the resistive element is overheated and subjected to an abnormal continuous current through tight thermal coupling between the fuse element and the resistive element;

An indicator component N (neon lamp, fluorescent lamp) as shown in FIG. 3E, possibly also providing protection through interruption of the circuit (very fine filament lamp, magnesium) and primarily through the illumination of the connector. The connection of such an illumination device can of course be of the parallel type (by means of a series resistance following the indicator component, making it possible to maintain sufficient voltage to keep the system effectively operating in case of touch contact), as well as the semiparallel or series type with respect to the safety electrodes, this latter configuration furthermore permitting a sudden increase in light during touch contact;

A semiconductor device, such as a diode D, as shown in FIG. 3F, (possibly luminescent for indicator purposes) capable of furnishing high power in brief pulses, whereas the average amperage is limited to an extremely low level.

It is evident that the various preferred components described above, as well as their technological derivations, can be associated in many different ways, so as to guarantee the electrification of one or more electrodes for the purpose of the invention itself. Likewise, "simple excitation," which makes it possible to electrify the superficial metallic strips by giving them the same potential as the nearest dangerous connection (electrode 2A and connection 1A; electrode 2B and connection 1B, FIG. 3(a)) may be replaced or associated with a crossed excitation which makes it possible, respectively, to apply different potentials to the electrodes 2A and 1A, 2B and 1B, thus permitting unpleasant contact among them, which further adds to the safety of the system. Such an association is described in FIGS. 4A and 4B.

Figure 4A:
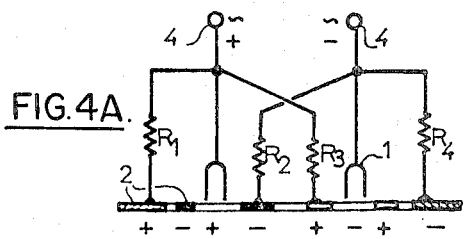
FIG. 4A is a schematic diagram illustrating another embodiment of the invention for use with a conventional socket.

FIG. 4A represents a diagram of a device providing regular excitation via resistors $R_1$ and $R_4$ and crossed excitation via resistors $R_2$ and $R_3$. In addition to the advantages explained in the preceding paragraph, this configuration makes it possible to use impedances with different values, facilitating a disagreeable discharge whose intensity is directly proportional to the proximity of the dangerous electrodes. A simple symbolic representation of the electrodes was selected here although various aesthetic forms may be recommended, for equivalent technical results.

Figure 4B:
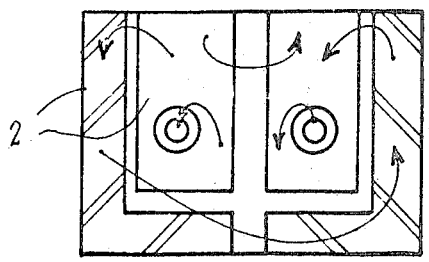
FIG. 4B is a plan view of the front surface of the socket of FIG. 4A.

In particular, the use of metal strips in concentric loops as shown in FIG. 4B, open or closed, slightly electrified toward the periphery and more strongly electrified in the vicinity of the dangerous connections, seems to be an elegant solution, comparable also to interlaced electrification or spiral metal coatings, in the form of waves, combs, etc.

Figure 5:
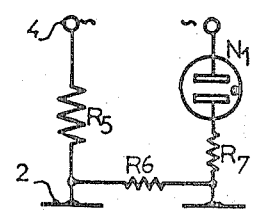
FIGS. 5 and 6 are schematic diagrams illustrating further variations of the invention.

FIG. 5 shows a possibility of associating the previously explained components, facilitating a rather low illumination of the connector and a more lively illumination in case of contact with the frontal metallic strips. Resistances $R_5$ and $R_7$ serve to limit the current. Resistance $R_6$, which is optional and has a much larger value, only maintains the minimum necessary current for the neon indicator light.

Figure 6:
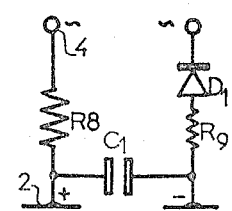

FIG. 6 shows a high-safety device which functions by means of impulses. The electrical network used — which is the direct or alternating type — as in the earlier cases, after rectification, furnishes the energy necessary for the charging of a storage capacitor connected through a low or zero impedance to the safety electrodes. The intensity of the brief current $I_{12}$ (see FIG. 1), furnished during high-value touch contact, is very disagreeable but drops to a negligible value which is absolutely inoffensive after discharge of the condenser. Nevertheless, this configuration makes the device ineffective in the case of currents $I_0$, $I_1$, and $I_2$ (see FIG. 1), if the average current permitted has a value that is too weak to guarantee a disagreeable sensation.

Figures 7, 8:
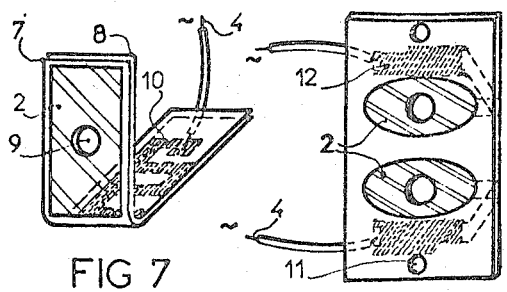
FIG. 7 is a perspective view of another embodiment in which the components are mounted on adhesive tape.
FIG. 8 is a plan view of the surface of a typical wall socket illustrating another version of the invention in which the current limiter and superficial electrodes are affixed to opposite sides of the socket face plate.

FIG. 7 shows a specific possibility for this device, combining a safety metallic strip 2 and a current limiter 10, affixed to adhesive tape 7 and 8, thus facilitating the positioning of said device on a conventional domestic connector. Opening 9 makes it possible to gain access to the dangerous terminal. Resistant element 10, inserted between two thicknesses of insulating agent, may consist of a slightly conducting coat of paint deposited by means of stencil, directly upon one of the layers of adhesive tape. The power would be supplied to the device by connecting a thin wire to the interior element 10. A resistive electrode 2 may be used although the limitation of the current must nevertheless be guaranteed at a place that is inaccessible during operation.

This type of component is inexpensive and easy to use; it facilitates the active protection of any conventional, single voltage or multivoltage connector, by means of one or several metallic strips. The mechanical and hydroscopic properties of the tape used are among the criteria defining the stability of the device as well as its reliability and are very important.

FIG. 8 shows a basic device somewhat similar to the preceding one, characterized by the use of two electrode assemblies 2 and current limiters 12, associated on the same rigid support, here a socket face-plate, making it possible, in a single operation, to protect a female wall socket, the attachment of the rigid support here being capable of being accomplished by the screws of the principal connector, benefitting from openings 11 provided for this purpose, or by means of glueing the elements to the support. The energy is applied through thin wires connected to the terminals inside the wall connector or possibly by thin rigid latches which are mechanically in one piece with the support, stuck into the high-power connections, and taking up a portion of the inside contour of the connections, benefitting from their fineness and rigidity; this arrangement, though less viable, permits almost instantaneous mounting of the device. A flat, current limiting element of the resistance type, for example, applied by stencil, offers the advantage of a large heat-exchange surface which promotes its performance in case of a short-circuit in the outside metal coatings.

FIG. 9 shows one way of using the device in association with a conventional male connector on the end of an electrical cord. The danger zone to be protected here is the zone of high-amperage connections 1; a set of simple electrodes 2 makes contact unpleasant in case the connector is recklessly touched. A brightcolored marker might possibly point out the precise area of the dangerous electrode and the safety electrode. The safety electrodes represented here, for the purpose of cost reduction, are made up of the electrical lead wires of resistive or capacitive components 3, the free ends of the latter being hooked into the body, so as to assure their simple and effective positioning, possibly associated with a system of grooves. Connection 13 of the current limiting impedance component may be accomplished by screwing, welding, crushing, or crimping, depending upon the design of the connector. The casting of the device must permit its cooling in case of improper utilization, although a capacitive component may then be preferable, while the price is less competitive in combination with equivalent reliability. The shape of the body 14 may of course be any whatsoever, and may involve reliefs, in an area far from the electrode set, that guarantees a good grip on the plug.

FIG. 10 illustrates the possibility of using the device in association with a conventional female connector. The danger zone of connections 1 is protected by a set of electrodes 2, arranged in interlaced comb fashion, deposited by means of metal-coating, glueing of aluminum foil in "ready to use" forms, or simply by applying a conductive coat of paint, all around the dead openings. This type of connector has forms and dimensions recalling those of a child's pacifier and is the cause of many dramatic accidents. The active protection, which involves an instantaneous unpleasant sensation in case of hand or mouth contact, protects the child long before it has taken the fatal step of putting the connector into its mouth. It should be noted that connection cable 15 can also be protected partly or completely by two or more surface metal coatings benefitting from the impedance elements already used in the main connector. This configuration offers the possibility of totally electrified male/female extension cords involving only two impedance elements while the safety electrodes of the male and female connectors and the cord are connected in parallel.

FIGS. 11A and 11B show the possible use of the device in the form of an active connection, making it possible instantaneously to protect any loose or suspended female connector. Body 19, combined with the unprotected female connector 16, for example, on the end of an extension cord, guarantees active protection, by means of electrodes 2, for the compact group thus constituted; the two elements (female and male connectors) are combined into one, i.e., affixed to each other, for example, by an adhesive strip 17. Safety electrodes 2, highly simplified here, could of course have some of the more desired shapes, as could the adhesive device 17, advantageously be replaced by a mechanical setup leading to the expansion of one or more of the male electrodes 4, following mechanical tightening, for example, from the end where the female connections 1 are located, which facilitate easy interchangeability as well as very effective interconnection. Numerous other forms of connections may be envisioned without, of course, going beyond the framework of the invention, in particular, we contemplate here devices for eccentric arrangement, devices for clamping as well as spring devices. The current limiting impedance components may be of the capacitive or resistive type, the latter possibility necessitating adequate dimensioning of the cross-section of the connection to permit necessary heat evacuation at crimping point 18 in the case of a covered or badly ventilated circuit.

FIGS. 12A, B, and C represent the possible use of the device in association with a conventional socket cap 21, a combination which considerably increases the safety of this socket concealment device, because it discourages attempts by the child to dismantle the device. Several inexpensive versions are shown here without any further limitations. The impedance element 3, incorporated into the two nonconductive prongs or under the front face, may receive energy from the main connector 4 by means of a conductive terminal cap 23 or directly by means of hook-up 22.

Likewise, the safety electrode may consist of a rivet 20 (FIG. 12B) or the direct output of the connection of the component, with appropriate length, or simply hooked on (FIG. 12C), and then covered with a conducting paint thus forming a fine electrode with any shape whatsoever.

FIGS. 13A, B and C show the possible use of the device combined with a multi-socket adapter (here a two-socket one). The limiter elements 3 (FIGS. 13B and 13C) and the electrodes 2 are intimately connected to the apparatus and may be deposited directly (by stencil, for example) on the rear plate 25 as well as on the forward face 24, their junction being accomplished by the superposition of the two conducting layers 27 and 2, followed by clamping during the mounting of the device. A fuse 26 or a weak point 29 (FIG. 13C) may be interposed in the current path so as to further increase the high reliability of the system. The large cooling surface available to the current limiters 3 prevents them from being over-heated. Electricity is supplied to the safety network by means of conducting washers 30 which contact the electrodes 4 and blocking washers 31, electrodes 1 being connected by elastic screw-type friction devices; this moreover ensures the mechanical adhesion of the assembly by means of screwing into the body 24. A nonconductive plate 28 may be used to insulate the power and safety circuits. An adhesive 17 makes it possible to positively affix the adapter to a female connector, for example, on the female end of an extension cord.

Experimentation conducted with an electrical network of 220 volts at a frequency of 50 hertz produced good results for an impedance value of several tens of kilohms (for example, 82,000 a purely indicative value, of course). This resistance value is equivalent to a capacitance of 33,000 picofarads, at 50 hertz, while being entirely compatible with requirements of size, reliability, and cost (this value of course is also indicative); of course, the cost here is less attractive than for a deposited resistive component. The values of the components are to be determined for each type of electrical network by Ohm's Law; the unpleasant current here is on the order of a milliampere and can fluctuate around that value which is likewise purely indicative within large proportions depending upon the manner of operation desired.

While the above explanatory description is directed to common European domestic connectors for use with 220 volt, 50 hertz systems, the underlying principles are applicable without substantial variation to other conventional systems such as standard flat electrode American connectors for 110 volt, 60 hertz systems.

It goes without saying that the previous descriptions are given here in connection with the explanatory drawings and that any equivalents to the component elements mentioned by way of preference could be introduced here without going beyond the scope of the attached claims.

In particular, any type of existing industrial conductor could be improved by the addition of a current limiting network associated with a set of electrodes of various shapes; the proper operation of the device is in no way a function of the mechanical support used.

I claim:
1. A safety device for an electrical connector, comprising support means providing electrical terminals at an exposed surface thereof and electrically conductive means for providing at said exposed surface a harmless electrical sensation upon careless contact therewith.
2. The device of claim 1, wherein said conductive means includes an electrical conductor arranged on said exposed surface spaced from but adjacent to one or more of said terminals, and means for electrically connecting said conductor to one of said terminals to supply limited current to said conductor.
3. The device of claim 2 wherein said conductive means further includes another conductor arranged on said exposed surface spaced from but adjacent to one or more of said terminals and said one conductor, and another means for electrically connecting said other conductor to another one of said terminals to supply limited current to said other conductor.
4. The device of claim 3, wherein said connecting means each includes a series-connected impedance component.
5. The device of claim 4 wherein said impedance component is a resistor.
6. The device of claim 4 wherein said impedance component is a capacitor.

7. The device of claim 4 wherein said impedance component includes a resistor and a capacitor.

8. The device of claim 3 wherein said connecting means each further include a series-connected safety component for interrupting the interconnection of said conductor and said terminal.

9. The device of claim 8 wherein said safety component is a fuse.

10. The device of claim 8 wherein said safety component is a lamp.

11. The device of claim 8 wherein said safety component is a diode.

12. The device of claim 3 wherein said conductors are in the form of flat metallic strips affixed to said exposed surface.

13. The device of claim 12 further comprising adhesive tape, said strips being mounted on said tape to facilitate affixation to said exposed surface.

14. The device of claim 13 wherein said connecting means each includes a series-connected impedance component also mounted on said adhesive tape.

15. The device of claim 1 wherein said electrical terminals are provided in male form on one side of said support means and in female form on the other side thereof, said conductive means providing said sensation on the exposed surface of said other side of said support to protect said female terminals.

16. The device of claim 15 wherein a multiplicity of parallel female terminals are provided on said other side.

17. A safety electrical adapter comprising support means having a pair of male electrical terminals protruding from one side and at least two pairs of corresponding female electrical terminals on the other side in parallel electrical contact with said male terminals, an insulating backplate through which said male terminals extend, a pair of flat metallic strips with apertures separately arranged on said other side surrounding said female terminals but allowing access thereto through said apertures, a pair of resistive conductors arranged on the interior side of said back plate each contacting at one end a respective male terminal and at the other end one of said strips.

18. The adapter of claim 17 wherein each said resistive conductor has a weakened portion for circuit interruption during overload.

19. A safety socket cap comprising a socket cap with prongs extending perpendicularly from a flat base, a pair of electrical conductors arranged on the exposed surface of said base, means for electrifying said conductors so as to produce a harmless electrical sensation upon careless contact with said socket cap.

20. The cap of claim 19 wherein said electrifying means includes resistive electrical connectors between each conductor and the outer surface of a respective prong.

* * * * *